3,303,761
MACHINE FOR FORMING, FILLING, CLOSING AND SEALING PLASTIC COATED PAPERBOARD CONTAINERS
Charles Z. Monroe, Detroit, and Harry B. Egleston, Livonia, Mich., assignors to Ex-Cell-O Corporation, Detroit, Mich., a corporation of Michigan
Original application June 7, 1961, Ser. No. 115,367, now Patent No. 3,239,995, dated Mar. 15, 1966. Divided and this application Apr. 7, 1965, Ser. No. 462,773
3 Claims. (Cl. 93—44.1)

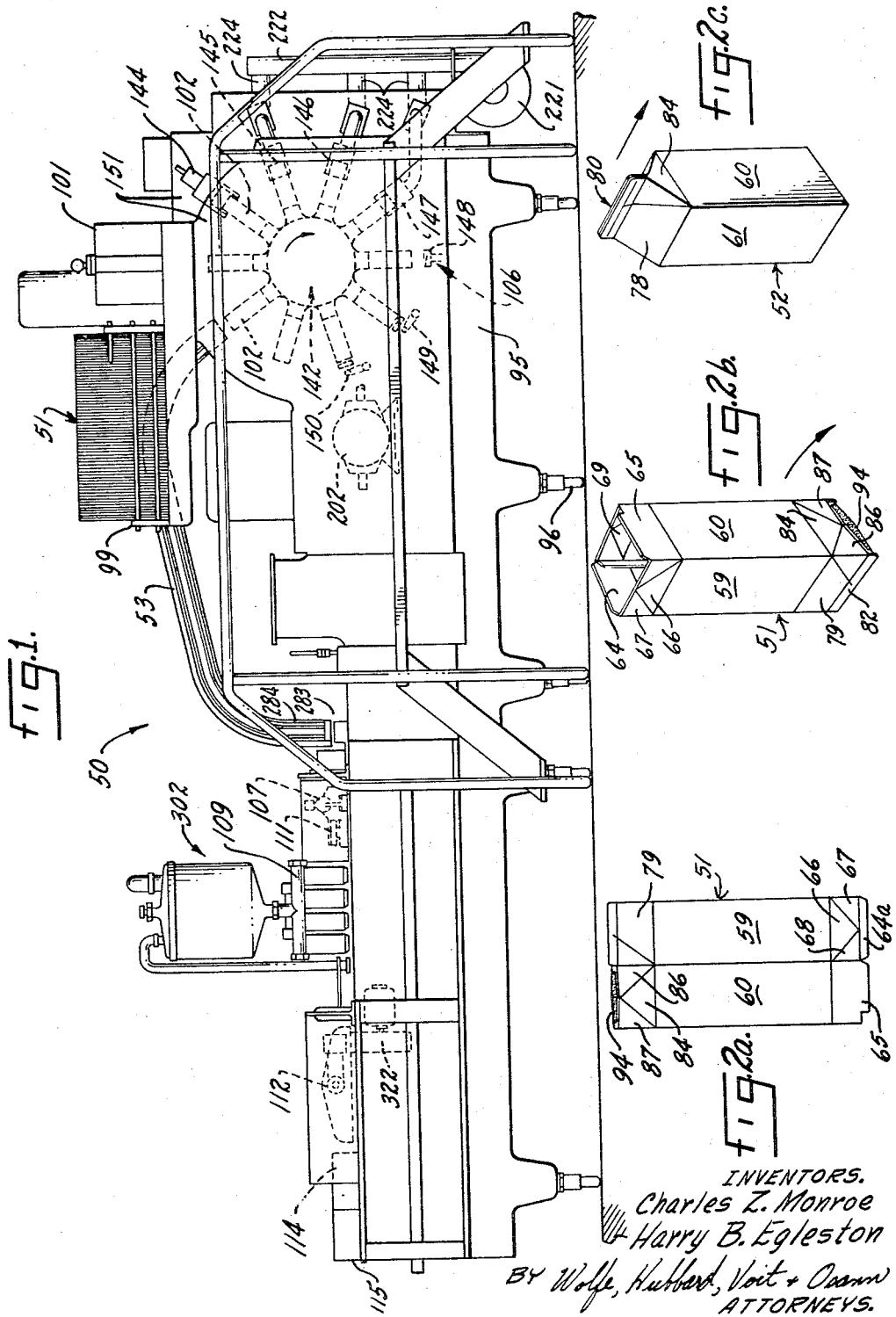

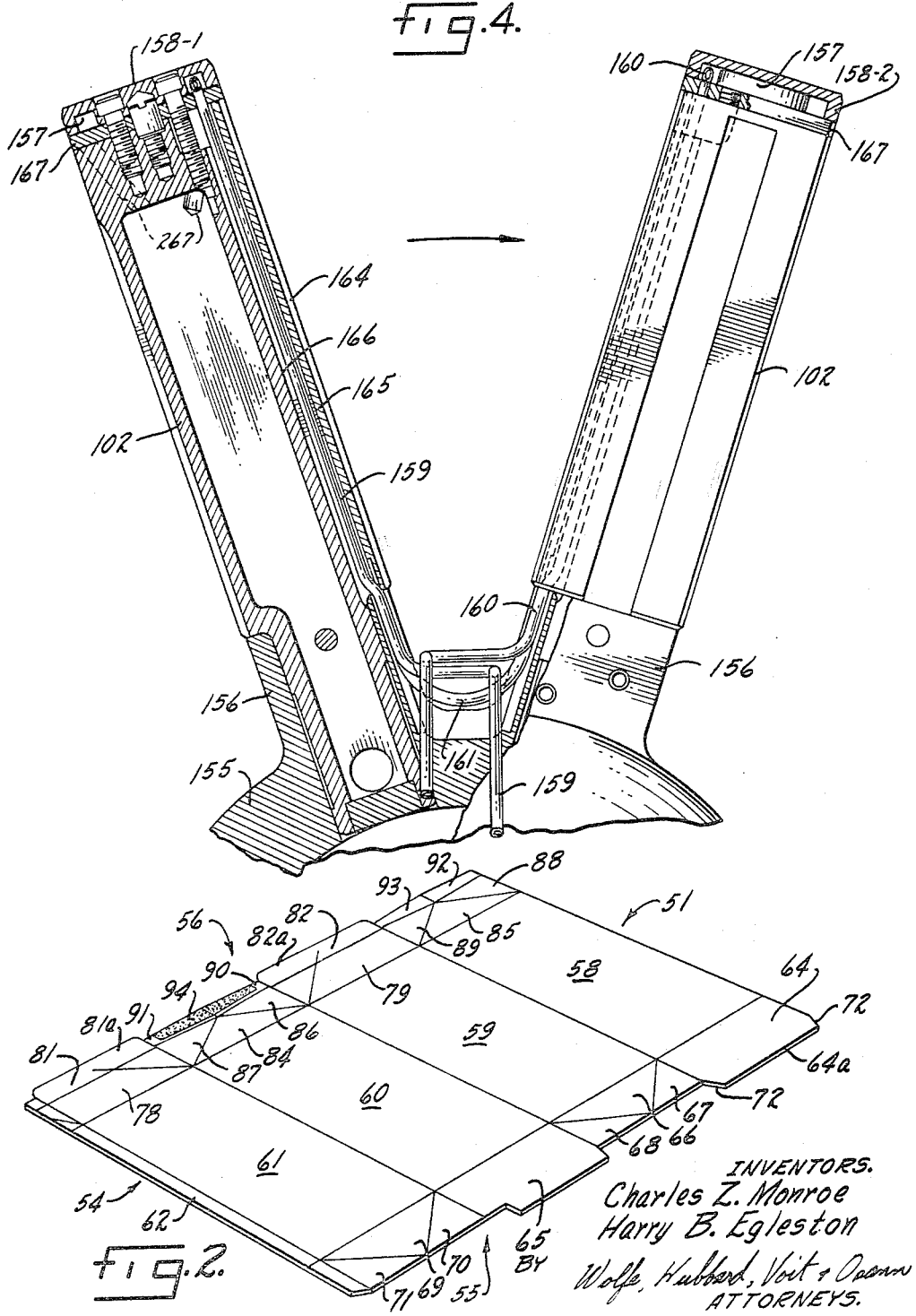

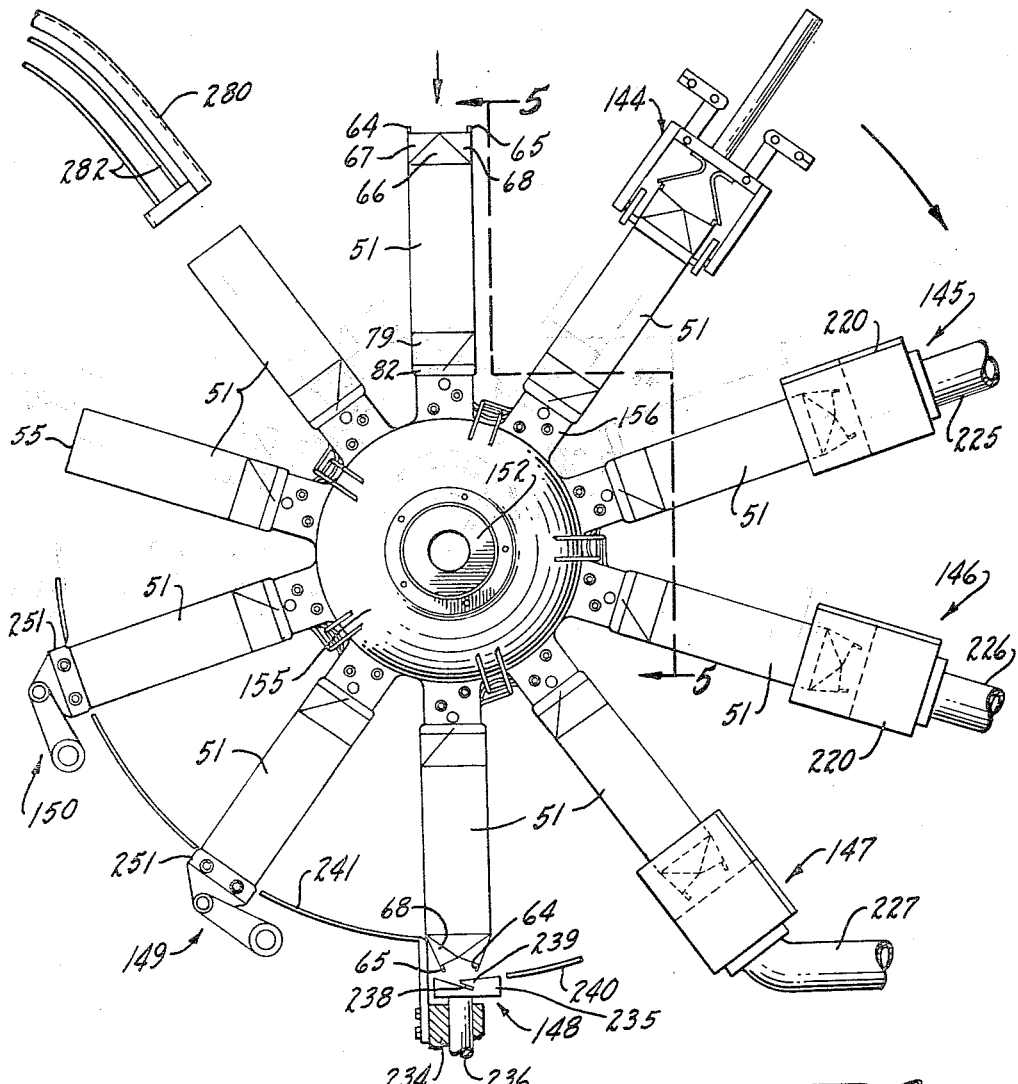

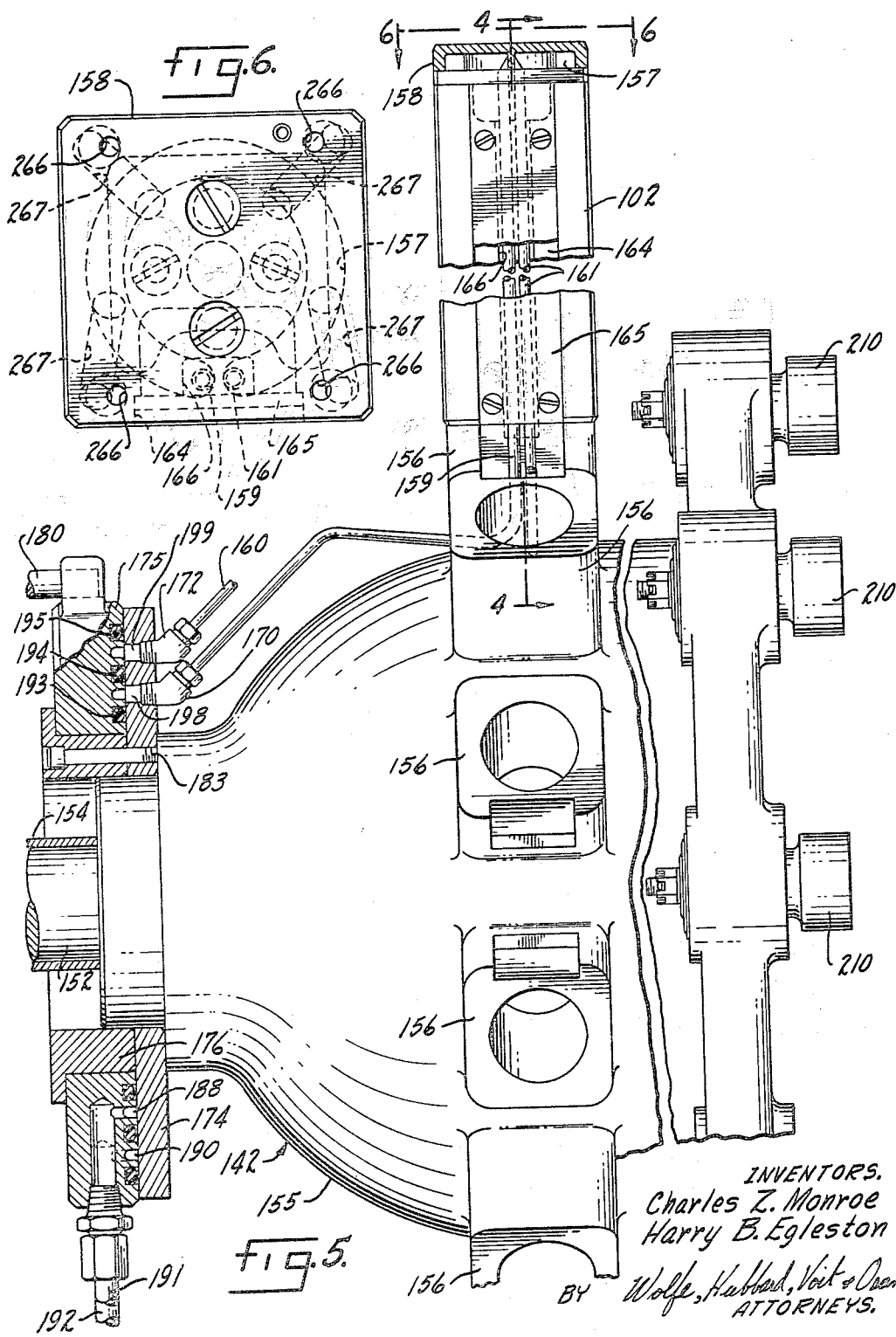

This application is a division of our copending application Serial No. 115,367, filed June 7, 1961, now U.S. Patent No. 3,239,995, issued March 15, 1966.

The present invention relates to packaging machines and, more specifically, to improvements in machines for forming, filling, closing and sealing plastic coated gable top containers of paperboard or the like. The machine finds particular, but not exclusive, utility in producing filled and sealed cartons from flat collapsed blanks of paperboard or the like having a thermoplastic moistureproof coating on their inner and outer surfaces.

One illustrative form of carton adapted to be processed by the machine disclosed and claimed herein is shown in Egleston et al. copending application Serial No. 707,259, filed in the United States Patent Office on January 6, 1958, now abandoned. More detailed information on such carton may, of course, be had upon direct reference to such application. For present purposes, however, it will suffice to note that the container or carton disclosed therein is made of high grade paperboard stock coated on both sides with a thermoplastic material such as polyethylene. The polyethylene coating on the paperboard is utilized not only as a moistureproofing material but also serves as a heat and pressure sensitive adhesive which cooperates in sealing the closure elements of the container so as to make a fluidtight package. Because sealing involves the application of considerable heat and pressure, suitable precautions must be taken to avoid damaging the polyethylene coating as the cartons are erected and sealed. Major reasons for this are the relatively low melting point of polyethylene and its tendency to stock to heated surfaces.

One object of the present invention is to provide a machine for erecting and filling cartons of thermoplastic coated paperboard or the like which is remarkably simple in organization and operation, occupies a relatively small amount of floor space, and is capable of high-speed operations with the smaller, hard-to-handle cartons.

Another object of the invention is to provide a machine of the character set forth and which will be adapted to the exclusive use of gas heaters to fuse and seal the coated top and bottom closure elements of the carton by utilizing the thermoplastic coating as an adhesive without damaging the moistureproof integrity of the thermoplastic coating.

A further object is to provide for such machines an improved rotary mandrel assembly supporting cartons for bottom closure forming operations and including a compact closed system for circulating cooling fluid through the end portions of the mandrels during heating and pressure sealing of the carton end closure.

Other objects and advantages will become apparent in the light of the following detailed description, taken together with the accompanying drawings, wherein:

FIGURE 1 is a side elevational view of an illustrative carton forming machine embodying the present invention;

FIG. 2 is a plan view of a flat carton blank;

FIG. 2a is a flattened tubular blank constructed from the blank shown in FIG. 2;

FIG. 2b is a perspective view of a squared out tubular blank;

FIG. 2c is a perspective view of a sealed carton;

FIG. 3 is an end elevational view of the mandrel wheel assembly of the machine including various associated units for operating on the carton at different stations along its path of movement;

FIG. 4 is a fragmentary sectional view taken in the plane of lines 4—4 in FIG. 5 of the mandrel wheel assembly detailing the cooling fluid conduit arrangement.

FIG. 5 is an enlarged fragmentary transverse sectional view taken in the plane of lines 5—5 in FIG. 3 showing a portion of the mandrel wheel assembly and the hub thereof;

FIG. 6 is an enlarged elevational view showing the end of one mandrel element taken in the plane of the line 6—6 in FIG. 5;

FIG. 7 is a diagrammatic view presenting a plan view of the drive system of the machine.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring more specifically to FIG. 1, the invention is there exemplified in an illustrative machine 50 adapted to receive a supply of flattened tubular blanks 51 such as shown in FIG. 2a, process them automatically at high speed, and to discharge them in the form of filled and sealed cartons 52, FIG. 2c. Before presenting a detailed description of the machine 50, however, it would be desirable to outline briefly the salient features of the carton blank 51 and the carton 52 processed by the machine 50.

A flattened tubular blank 51 (FIG. 2a) is formed from a flat blank of paperboard or the like (FIG. 2) coated on both sides with thermoplastic material such as polyethylene, by folding the flat blank together and gluing the side seam. Each flattened tubular blank 51 is squared out at a squaring station until it is truly tubular in shape, as shown in FIG. 2b. The completed carton 52, shown in FIG. 2c, comprises a tubular body 54 of generally rectangular cross section having a bottom closure 55 and a top closure 56. Both the top and bottom closures are formed from integral extensions of the carton body and are held and sealed together in a manner which takes full advantage of the properties of thermoplastic coating on the carton material.

The carton blank is divided by means of an appropriate pattern of score lines into a plurality of panels and areas which are utilized for the walls and the closure parts of the carton. Upon reference to FIG. 2, which illustrates the blank, it will be noted that the body portion of the carton is defined by four side panels 58, 59, 60, 61 and a side seam flap 62 which is adapted to be adhesively secured to the inner face of the side panel 58.

The bottom closure 55 is defined in part by a pair of major bottom panels 64, 65 which are integral extensions of alternate side panels 58, 60, and in part by a plurality of minor triangular panels 66, 67, 68 and 69, 70, 71 which are integral extensions of alternate side panels 59, 61. All of the bottom closure panels are integral parts of the blank and adjacent ones are separated from each other only by score lines which ultimately define the various folds or creases required to complete formation of the bottom closure. When the bottom closure is formed, the triangular panels 66, 69 fold inwardly toward one another and the respective pairs of smaller triangular panels associated with them fold back against the inner faces of the major bottom panels 64, 65. The projecting lateral edges 72 of the panel 64 are chamfered slightly, defining in the projecting portion of the panel 64 a tuck-in flap 64a which is inserted between the inner face of the major bottom panel 65 and the triangular foldback panels 68, 70 which tend to fold back toward the inner face of the panel 65. The bottom closure parts, when fully infolded, are pressed flat and heat sealed in this position.

The top closure 56 (FIGS. 2, 16) has substantially a gable top configuration comprising a pair of inclined roof panels 78, 79 surmounted by an upstanding top rib 80, defined in part by rib panels 81, 82. Interposed between the roof panels are triangular end panels 84, 85 each connected respectively to a pair of triangular foldback panels 86, 87 and 88, 89. Each pair of foldback panels is also connected to a corresponding pair of inner rib panels 90, 91 and 92, 93.

The top closure of the carbon 52 also includes an extensible pouring spout which, in this instance, happens to be defined by triangular end panel 84, foldback panels 86, 87 and inner rib panels 90, 91. Initially, the spout is disposed in tucked-in condition within the top closure and protectively sealed by means of sealing panels 81a, 82a which are abuttingly secured together along the entire length of the top rib. To facilitate easy opening of the carbon 52 and accessibility of the pouring spout, the pouring edges of the latter, together with the major areas of the inner rib panels 90, 91, may be covered with a patch or lip 94 of abhesive or non-adhesive material. By this is meant material which will not bond to itself or to the thermoplastic coating on the surfaces of the blank during heat sealing of the top closure. Consequently, upon application of upward and outward thumb pressure to the infolded triangular panels 86, 87 under the inclined roof panels 78, 79, the bond between certain carton panels becomes torn or fractured to spring the spout into its outwardly extending position ready for pouring. The bonded areas broken are between: (1) panels 81a and 82a over panels 90 and 91; (2) the outer face of rib panels 90 and 91 not covered by the abhesive material; (3) the inner faces of panels 91 and 81; and (4) the inner faces of panels 90 and 82.

*General machine organization*

Referring more particularly to FIG. 1, the illustrative machine 50 is especially suited to the high speed erection and filling of the smaller cartons such as the quart or pint size which have, of course, the same cross sectional area. A supply of flat side seamed blanks for such cartons is stacked in a magazine from which the blanks are successively withdrawn, erected into open-ended tubular form and loaded top first straight down onto mandrels 102 of a multi-station bottom forming rotary mandrel assembly on which the bottom closures are formed and sealed as the rotary mandrel assembly is indexed through its stations. Following the formation of the bottom closures, the semi-formed cartons are successively ejected from the mandrels and conveyed bottom first along a tubular trackway 53 defined by spaced parallel strips, being inverted in the course of such movement to arrive upright at a conveyor. The cartons are then transferred along a straight path through the machine to top breaker and steepler mechanisms, resulting in breaking or flexing of the top closure elements about their score lines, a filler mechanism, and then beneath top heater, closer and sealer units which activate the thermoplastic and seal the top closure elements. Following this, the filled and sealed cartons are discharged in a continuous procession from the machine. For convenience, the partially completed cartons will be designated by the reference numeral 51 at their various stages of completion in the machine, and by the numeral 52 upon emergence from the machine as a finished product.

The machine 50 comprises a machine base 95 supported on legs 96 and supplied with utilities such as electric power, compressed air, gas fuel and cooling water from appropriate external sources. A magazine 99 is mounted on top of the right end of the machine as viewed in FIG. 1. Operatively associated with the magazine and adjacent to it is a loader mechanism 101 which may be of any suitable conventional type. The feeder and loader mechanisms 101 (FIG. 1) are adapted to withdraw blanks successively from the magazine, erect them into open-ended tubular form, and then load them into the rotary mandrel assembly for bottom closing. For such purpose, these mechanisms are driven in synchronism with each other from the main drive of the machine.

A rotary mandrel assembly with a plurality of mandrels 102 to which the blanks are transferred by the loader 101 after erected into tubular form is situated below the loader 101, being housed within an appropriate protective enclosure. The rotary mandrel assembly and associated bottom closure forming mechanism 106 is adapted to receive blanks successively from the loader 101, top down, and to move them from station to station in an orbital path to form their bottom closure. The blanks are then ejected and presented upright to a top breaker unit 107 on top of the machine base. From this point on, the cartons remain above the top of the machine base and are moved by the main chain type conveyor 108 in a horizontal straight path through the machine.

The main conveyor presents the open top cartons to the filler unit 109. The latter fills the cartons successively. The main conveyor 108 thereupon moves the filled cartons, still open at the top, under stationary top heater and closer units 112, 114. From here, the filled and closed cartons are transferred to a top sealer unit 115. Upon final sealing of the latter, the filled and completed cartons are stamped by the pressure jaws, if needed, and discharged from the machine.

*Rotary mandrel assembly*

For bottom closure forming, the tubular blank 51 is loaded on a mandrel 102 of an intermittently driven mandrel assembly 142 carrying a plurality of such radially disposed mandrels, in this instance ten in number, and a plurality of cooperating station units with which the mandrels are adapted to register sequentially during the course of their intermittent or indexing movement. These station units are a bottom breaker unit 144, a plurality of heater units 145, 146, 147, a bottom closing unit 148, and two bottom sealing units 149, 150. Both the mandrel assembly and the station units are supported on a relatively heavy upright frame panel 151 within the machine base.

The mandrel assembly (FIGS. 3–6, 17) comprises a relatively large diameter shaft 152 journaled in an appropriate bearing 154 carried by the frame panel 151. One end of the shaft 152 has fixed thereto a large bell shaped hub 155. In the present instance, the hub 155 has ten equally spaced hollow projecting stubs 156 into which the inner ends of the mandrels are inserted and the mandrels fixed in place.

One of the important features of the present invention relates to the provision of means for supplying fluid coolant to the mandrels 102 to cool the end faces of the latter and thereby preclude adhesion with the bottom closure parts of the carton 51 being formed thereon. In keeping with this invention, water or other suitable fluid coolant is circulated through interior passages 157 of end caps 158 on all mandrels 102. As herein shown in FIGS. 3 and 4, the coolant fluid system contemplates supply of fluid to pairs of mandrels 102 each pair having supply and return tubes 159, 160 respectively and a U-shaped connecting tube 161. Accordingly, the further description will be confined to the arrangement in one such pair of mandrels and it will be understood that the same arrangement is found in the other mandrel pairs so that the end face of each mandrel 102 is cooled.

Also referring to FIG. 5, each mandrel 102 is square in cross section to slidably receive the tubular carton blank 51. One side of the mandrel, the side visible in FIG. 5, for example, is provided with a radially extending groove 164 having a deeper center channel 166 in which either the supply or return tube 159, 160 lies along with one leg of the U-shaped connecting tube 161 associated with the particular mandrel. An elongated plate 165 is fixed in place within the groove 164 over the tubes 159, 161. The outer ends of the tubes of each mandrel project through a mounting plate 167 which is fastened to the end of the mandrel 102 and is interposed between the mandrel and the end cap 158. The tubes are fixed to the mounting plate 167 with the extremities of the tubes cut off to allow flow of fluid between the tubes and the interior passage 157 of the end cap 158. The passage 157 in each end cap 158 is crescent shaped in communication at one end with either the supply or return tube and at the other end with the connecting tube to provide for circulation of fluid coolant.

Where the supply or return tubes 159, 160 enter the base of the mandrel 102 they are bent at right angles for fastening to fittings 170, 172 carried by an annular plate 174 fixed to the rotary hub of the mandrel assembly for turning with the latter. This annular plate carries the fittings for each water tube assembly and is rotatable adjacent a water slip-ring 175 which is piloted on the shaft 152 by a member 176. The water slip-ring 175 is held against rotating by a bar 180 supported by a bracket 182 fixed to the machine frame 151. The pilot member 176 and plate 174 are fixed to each other and to the mandrel hub by means such as machine screws 183, permitting the mandrel hub to turn without restriction within the fixed slip-ring. As shown in FIG. 5, the face of the slip-ring abutting the annular plate 174 is provided with a pair of concentric water conveying grooves 188, 190 one of which is connected to the pressure side of a coolant fluid system such as a water system via the supply conduit 191 and the other of which is connected to the return side of the system via the conduit 192. Other annular grooves 193, 194, 195 in the plate receive sealing rings. With this arrangement, it will be understood, coolant fluid is supplied from the pressure groove 188 of the fixed coolant slip-ring 175 to the supply tube 159 of the mandrel coolant tube assembly via a passage 198 in the plate 174 and the fitting 170. After this coolant is circulated through the end cap 158-1 on the first mandrel, and conveyed to the end cap 158-2 on the second mandrel by the connecting tube 161, the coolant is returned to the return groove 190 of the coolant slip-ring 175 via the return tube 160, fitting 172 and a passage 199 in the plate. Similar fittings 170, 172 are spaced equally around the annular plate 174, one set for each pair of mandrels 102 and each fitting set is connected by passages 198, 199 to the pressure and return grooves 188, 190 of the plate. This arrangement thus provides for the continuous circulation of coolant from the coolant system to each mandrel of the rotary assembly thus permitting the coolant to be replenished and cooled to maintain the end caps on the mandrels contacting the bottom closure parts at a suitable low temperature to prevent adhesion. Power for driving the mandrel assembly with a step-by-step indexing motion is furnished by any suitable drive mechanism such as from the main drive motor 202 of the machine via chain and sprocket drive 204 and main drive shaft 206 as shown in FIG. 7. The latter has fixed thereon a barrel cam 208 the track of which receives follower rollers 210 carried by the hub of the mandrel assembly as shown best in FIGS. 5 and 17. The track of cam 208 includes sufficient dwell so that the hub, through its follower rollers 210, is given an intermittent angular motion.

Following the loading of an open-ended carton blank 51 on a mandrel 102 by the loader mechanism, top down, the mandrel assembly moves the blank through an indexing step, thereby bringing the blank into register with the bottom breaker unit 144 (FIG. 3). Details of a suitable breaker unit 144 are fully disclosed in copending application Serial No. 67,842, filed November 7, 1960, entitled "Machine for Forming Plastic Coated Paperboard Containers." In this position, all the bottom closure panels overhang the end of the mandrel and the common score line connecting them to the carton side panels is approximately even with the end face of the mandrel. The major bottom panel 65 is in leading position and the other major bottom panel 64 is in trailing position with respect to the direction of mandrel movement. Minor triangular panels 66, 67 and 68 face toward the water slip ring 175, while minor triangular panels 69, 70, 71 face away from the slip ring.

The bottom breaker unit 144 is adapted to effect substantial prebending of the bottom closure parts on their respective score lines and toward their closed position. The prebending action is carried to a sufficient extent to create along each score line, insofar as possible, a permanent set in the paperboard and its thermoplastic coating. This greatly facilitates the subsequent closing and sealing of the bottom closure elements of the blank.

Following the bottom breaking operation, the mandrel assembly indexes the carton 51 around the heater stations 145, 146 and 147. In order to avoid overheating of the bottom with possible damage to the paperboard or the thermoplastic coating, and yet drive sufficient heat into the bottom closure panels to achieve effective sealing, resort is had to a series of heating stations, in this instance, three in number (FIGS. 1 and 3). These stations are substantially identical and are adapted to apply warm air to both sides of the bottom closure panels so as to raise their temperature sufficiently to activate the adhesive action of the thermoplastic coating on the carton blank. Where polyethylene is used as such coating, the temperature of the blank must be increased to approximately 350 to 500 degrees Fahrenheit.

As shown more particularly in FIGS. 1 and 3, each heater station comprises a hollow boxlike heater head 220 fixed to the main frame panel and adapted to nestingly straddle the radially projecting bottom closure panels of the carton 51 as it is held in position by an underlying registered mandrel. For details of the head construction reference may be made to the above identified copending application.

Air is supplied to the heater heads 220 from a blower 221 mounted near the lower right corner of the frame panel 151 as viewed in FIG. 1. The blower 221 discharges into a vertical manifold 222 which connects at vertically spaced points with three separate combustion chambers 224. The latter are connected to respective ones of the heads 220 via individual supply ducts 225, 226 and 227 which communicate respectively with the plenum chamber of each head. Combustion is, of course, carefully controlled so as to be as complete as possible. With an excess of air (as far as the burner is concerned) supplied to the burner of each combustion chamber, the combustion products mix with the excess air in the combustion chamber, resulting in the discharge of a blast of heated air at each heater head 220 having, in the present instance, a temperature of about 800 degrees Fahrenheit. By the time the blank 51 is ready to leave the last heater station 147, its bottom closure panels have been heated to a temperature of 350 to 500 degrees Fahrenheit and are ready for closing and sealing.

After the heating operation, the mandrel assembly indexes and carries the blank 51 from the last heater unit 147 to the bottom closing unit or station 148 (FIG. 1). At this point, the bottom closure panels have been heated to a temperature sufficient to activate the adhesive action of their thermoplastic coating. In such condition, the particular coating used on the blank 51 will adhere to itself and to hot surfaces but not to cold surfaces of other material.

The bottom closing unit 148 (FIGS. 1 and 3) comprises a support block 234 fixed to the lower portion of the frame panel 151. The support block carries a closer shoe 235 and its guide plunger 236, both mounted for reciprocation approximately along a projection of the radius of the registered mandrel. The upper face of the closer shoe 235 is concave in a direction transverse to the plane of rotation of the mandrel assembly, such shape being defined by two angular surfaces. One such surface is undercut with respect to the other, defining a transverse slot 238 and a wedge-shaped tuck-in blade 239 in the central portion of the shoe. Upon elevation of the shoe 235 toward the mandrel, the slot 238 is adapted to engage the projecting end of the major bottom panel 65. At the same time, the blade 239 is adapted to engage the major bottom panel 64 and to tuck it into the space between the inner face of the panel 65 and the adjacent triangular fold-back panels 68, 70. The shoe 235 dwells in elevated position for a sufficient interval to permit withdrawal of the panel 65 of the closed, tucked-in bottom from the slot 238 as an incident to the next step of indexing movement of the mandrel assembly.

For the purpose of assuring proper orientation of the bottom closure panels on entering and leaving the closing station 148, the latter is equipped with fixed arcuate guides 240, 241. The guide 240 is disposed to prevent jamming or tearing of the free lower end of the bottom panel 64 against the edge of the shoe 235 when the same is in lowered position. The guide 241, on the other hand, is arranged to hold the closed bottom in that condition as the mandrel assembly moves it from the raised shoe 235 to the sealing station 149. Provision is made for driving the closer shoe 235 to reciprocate in properly timed relation to the mandrel assembly. Provision may also be made for cooling the closer shoe 235 to prevent sticking of the heated coated bottom closure panels to it.

From the bottom closing unit 148, the blank 51 next passes to the bottom sealing units 149, 150. The latter are substantially identical and, in this instance, two such units are used in order to subject the bottom closure to pressure for the necessary total interval of sealing time. As illustrated in FIG. 3, each sealing unit comprises a pressure pad 251 having fluid coolant circulating therethrough. Each pressure pad is pivotally supported and power operated to move through a relatively short displacement between a pressure applying position where it squeezes the bottom closure panels against the end face of the mandrel, causing them to assume the closed condition and an inactive position spaced farther away from the end face of the mandrel. The pivotal mounting tends to give each pressure pad a limited amount of float, permitting it to accommodate readily to the bottom closure elements of the blank 51 as it presses them against the end face of the mandrel.

Transfer mechanism

After the bottom seal is completed, the mandrel assembly indexes through another step and carries the blank 51 to a transfer station which, as indicated in FIG. 3, is one step short of the loading station. At the transfer station, the mandrel and blank 51 are upwardly inclined and the bottom closure occupies a radially outward position on the mandrel. The blank 51 is hereupon ejected from the mandrel by means herein shown as air pressure jets emitted from ports 266 in the end of the mandrel. Air passages 267 in the mandrel convey high pressure air from a source to the ports, and the supply of air to the mandrel is controlled so that the carton is ejected after the mandrel has been indexed to the transfer station.

While machines such as the one disclosed herein have formed cartons with uniformly high sanitary integrity, there may be some instances where a sanitizer unit is desired by the user or required by local health regulations. Such a unit may be located adjacent the mandrel assembly so as to receive a carton ejected from the mandrel at the transfer station. In the present case, for convenience of description, the sanitizer unit is not shown but the carton after ejection from the mandrel is transferred directly to the conveyor which moves the carton through the machine for filling and top closing operations. It will be understood that where such sanitizer is required and is located adjacent the mandrel assembly, each carton after being plunged in boiling water or exposed to germicidal lamps according to the type of unit employed, will be conveyed directly to the conveyor mechanism.

As herein shown, the carton 51 is conveyed directly from the mandrel assembly to the conveyor mechanism through an elevated open work trackway or slide 280 defined by parallel spaced rods 282. The air blast ejecting the carton 51 from the mandrel causes the carton to move bottom first up a slight incline in the trackway over the peak of the latter from where it will slide down the opposite slope to the delivery station 283 at the end of the chain conveyor. The terminal portion 284 of the trackway is substantially vertical so that the carton is delivered upright to the conveyor and in position to be filled and the top closed and sealed.

Machine drive

Referring particularly to FIG. 7, for completing the disclosure of this packaging machine details of the drive for certain of the components above described are shown. The main drive motor 202 as shown in this figure is connected by suitable means shown as a chain and sprocket drive 204 to the main drive shaft 206 which has fixed thereon barrel cam means 208. The track of the latter receives follower rollers 210 carried by the hub of the mandrel assembly (FIG. 5) and gives the latter an intermittent angular motion. The main drive motor 202 will also supply power to the bottom breaker 144 as well as the bottom closer 106 and presser plates 149, 150 associated with the mandrel assembly. Separate power means will be provided for the steepler and top breaker 107, 111, top closure sealer 115, and for the conveyor 108. Suitable control instrumentalities will be included to start, stop and coordinate the different mechanisms.

We claim as our invention:

1. In a carton forming machine for thermoplastic coated blanks of paperboard or the like having end closure panels defined therein, the combination comprising, fixed support means, an assembly of mandrels journaled on said support means and movable about a fixed axis, each mandrel being adapted to carry a blank, said mandrels being radially disposed in a common plane axially spaced from said support means and normal to said fixed axis, a plurality of heaters disposed for registration sequentially with the end of each mandrel to heat the blank bottom closure panels on the mandrel, means defining a fluid coolant passage in each mandrel end face to preclude adhesion of the heated thermoplastic coated blank bottom closure panels, coolant circulating conduits carried by each said mandrel for conveying coolant to and from said mandrel passage, means for circulating fluid coolant from a source through said conduits and said mandrel passages comprising a fluid coolant slip-ring fixed between said support and said common plane of said mandrels, said ring having supply and return grooves connected to said coolant source, a plate engaging said ring adjacent said grooves and movable with said mandrel, and coolant connections from said supply and return grooves through said plate to said conduits respectively.

2. In a carton forming machine for thermoplastic coated blanks of paperboard or the like having end closure panels defined therein, the combination comprising, a fixed support means, a mandrel hub journaled on said support means and movable about a fixed axis and carrying a plurality of radially extending mandrels each adapted to receive a blank, said mandrels being disposed in a common plane axially spaced from said support means and normal to said fixed axis, indexing drive means connected with said mandrel hub on the end remote from said support means, a plurality of heaters disposed for registration sequentially with the end of each mandrel to heat the blank bottom closure panels on the mandrels, and means defining a fluid coolant passage in each of the mandrel end faces to preclude adhesion of the heated thermoplastic coated blank bottom closure panels thereto, coolant supply and return conduits carried by said hub for circulating coolant through said mandrel passages, a source of coolant under pressure and a return thereto, and a fluid coolant slip-ring assembly fixed between said support and the end of said mandrel hub adjacent thereto for connecting said source and return to said rotating hub supply and return conduits respectively.

3. In a carton forming machine for thermoplastic coated blanks of paperboard or the like having end closure panels defined therein, the combination comprising, a fixed support, a support shaft journaled in said support for rotation about a generally horizontal fixed axis, a mandrel hub secured to said shaft and movable therewith about said fixed axis, said hub carrying a plurality of radially extending mandrels each adapted to receive a blank, said mandrels being disposed in a common plane axially spaced from said support and normal to said fixed axis, drive means connected with said mandrel hub on the end remote from said fixed support for driving said mandrel hub with a step-by-step indexing movement, a plurality of heaters disposed for registration sequentially with the end of each mandrel to heat the blank bottom closure panels on the mandrels, means defining a coolant passage in each of the mandrel end faces to preclude adhesion of the heated thermoplastic coated blank bottom closure panels thereto, supply and return conduits connected to the mandrel passages respectively of each pair of mandrels, a conduit connecting said passages in the ends of each said pair of mandrels, and means for circulating cooling water from a source through said conduits and passages of each pair of mandrels comprising a water slip-ring fixed in surrounding relation with said shaft between said support and the end of said mandrel hub adjacent thereto, said ring having annular supply and return grooves connected to said source, an annular plate engaging said ring adjacent said grooves and rotatably movable with said hub, said plate also surrounding said shaft, and coolant connections from said supply and return grooves through said plate to said supply and return conduits respectively.

References Cited by the Examiner
UNITED STATES PATENTS

| | | | |
|---|---|---|---|
| 2,831,651 | 4/1958 | Hutchings | 137—580 X |
| 3,064,542 | 11/1962 | Terry | 93—44.1 |

BERNARD STICKNEY, *Primary Examiner.*